Figure 1:
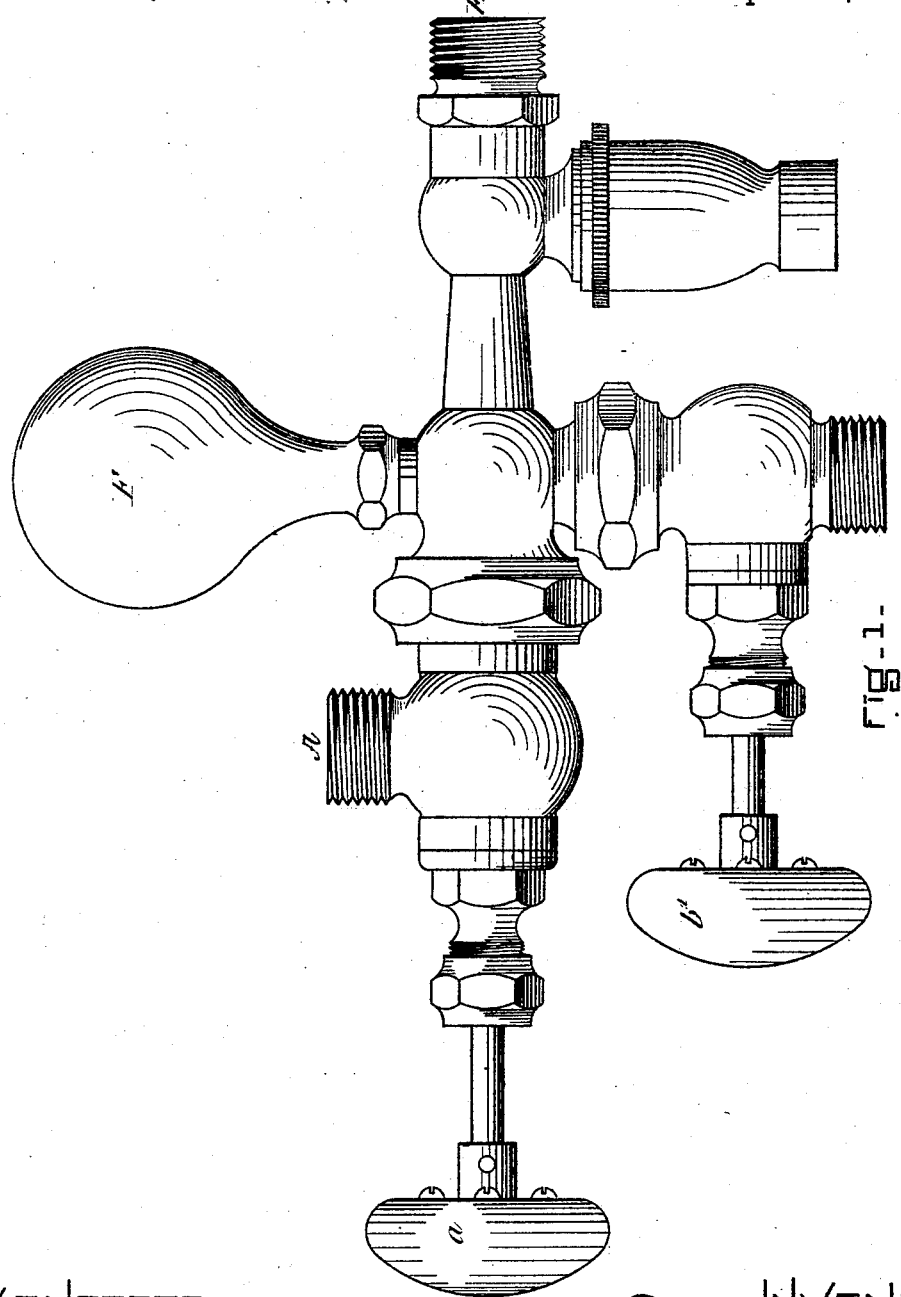

(Model.)

2 Sheets—Sheet 1.

J. H. McPHAIL.
INJECTOR.

No. 285,498.

Patented Sept. 25, 1883.

WITNESSES

INVENTOR

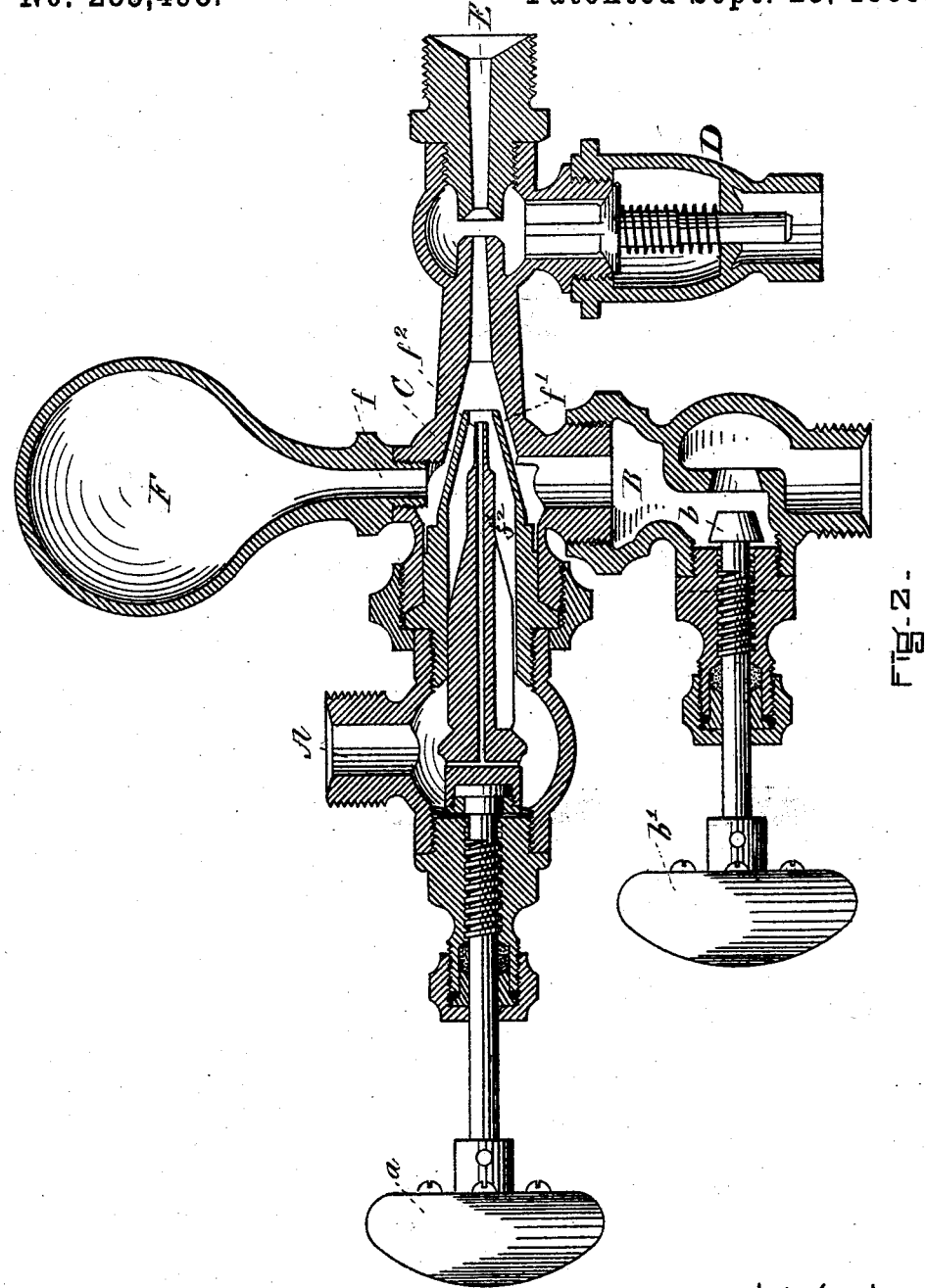

UNITED STATES PATENT OFFICE.

JAMES H. McPHAIL, OF BOSTON, MASSACHUSETTS, ASSIGNOR TO THE NATIONAL TUBE WORKS COMPANY, OF SAME PLACE.

INJECTOR.

SPECIFICATION forming part of Letters Patent No. 285,498, dated September 25, 1883.

Application filed March 23, 1883. (Model.)

*To all whom it may concern:*

Be it known that I, JAMES H. MCPHAIL, of Boston, in the county of Suffolk and State of Massachusetts, a citizen of the United States, have invented a new and useful Improvement in Steam-Boiler Injectors, of which the following is a full, clear, and exact description, reference being had to the accompanying drawings, forming a part of this specification, in explaining its nature, in which—

Figure 1 is a side elevation of an injector containing my invention. Fig. 2 is a central vertical section thereof.

The invention consists in providing an injector for steam-boilers and the like with an air-chamber so located in relation to the draft tube or pipe, and connected therewith, as to make the operation of the injector more regular and continuous, and to enable water or other liquid to be drawn from a greater depth than can be drawn by the ordinary steam-injector without this attachment.

In the drawings I have represented the air-chamber as attached to what is known as the "Mack Injector," made by the National Tube Works Company, of Boston; but it is shown in connection with such injector simply for the purpose of convenience, as it is adapted to be used with any inspirator or injector. In order to indicate, however, the relation of the chamber to the draft tube or pipe and their passages, I will refer to the drawings, in which A is the steam-induction passage, B the draft tube or pipe through which the water is drawn, C the injector-nozzle, D the overflow, and E the discharge-passage. $a$ is the handle operating the injector-plug. $b$ is a valve in the draft tube or passage, which is operated by the handle $b'$. F is the air-tight chamber, which preferably is connected by the passage $f$ with the chamber $f'$ about the injector-nozzle and just above the entrance of the draft tube or passage. $f^2$ represents the portion of the injector ordinarily called the "plug," and containing what is known as the "quill-passage," and which is adjustable by means of the handle $a$ and screw upon the stem connecting the handle and plug. I do not, however, intend to confine the location of the air-tight chamber to this especial position, but may use it anywhere between the steam-inlet and the end of the injector-nozzle, and connect it either with the chamber about the injector-nozzle or with the draft tube or passage itself, as may be desired. The chamber can be formed in any desirable way. The one represented is a cast-metal shell having an opening at its lower end. The air-tight chamber F must be so located in relation to the steam-nozzle as to enable a partial vacuum to be formed therein by the steam as it passes the entrance thereto, so that for lifting the water the injector not only utilizes the ordinary steam-jet, but has as a force or power the pressure of the atmosphere caused by the vacuum, more or less complete, in the air-tight chamber F, and the vacuum thus formed, while it assists the steam-jet in drawing or raising water, does not impede the action of the jet in feeding the water or forcing it from the injector, so that the steam-jet performs three functions. It not only serves to assist in drawing the water, but it forms the vacuum in the chamber F, and also forces or feeds the water or liquid from the injector.

By my invention I am not only enabled to draw water from a greater depth than it can be drawn by the ordinary injector, but the operation of the injector is very regular and continuous, and its range is increased, and water can be fed to the boiler against a greater steam-pressure than it can be by any other injector of which I have knowledge.

I am aware of the patent to Rue, Reissue No. 6,006, dated September 1, 1868, which describes an injector; but I do not claim as my invention anything therein contained.

Having thus fully described my invention, I claim and desire to secure by Letters Patent of the United States—

1. In a steam-injector, in combination with the steam-nozzle thereof, an air-tight chamber, F, located in relation to the nozzle C and the water-supply chamber or tube B as described, substantially as and for the purposes set forth.

2. In an injector, the combination of the steam-inlet A, the nozzle C, plug $f^2$, the chamber or passage $f'$, the supply pipe or passage B, the air-tight chamber F, located in relation to the nozzle C as specified, and outlet E, all substantially as and for the purposes described.

3. The combination, in an injector, of the steam-passage A, plug $f^2$, the nozzle C, the chamber or passage $f'$, the water-supply tube B, air-tight chamber F, located in relation to the nozzle C, as specified, discharge-passage E, and overflow D, all substantially as and for the purposes described.

4. In an injector, the combination of the steam-nozzle C, arranged in relation to the water-supply tube B and discharge-passage E to raise water and force it through said discharge-passage, with an air-tight chamber F, arranged in relation to the nozzle C as described, all substantially as and for the purposes set forth.

JAMES H. McPHAIL.

Witnesses:
F. F. RAYMOND, 2d,
FRED. HARRIS.